(12) United States Patent
Lee et al.

(10) Patent No.: US 8,045,528 B2
(45) Date of Patent: Oct. 25, 2011

(54) FEEDBACK METHOD FOR PERFORMING A FEEDBACK BY USING A CODEBOOK IN MIMO SYSTEM

(75) Inventors: Wook Bong Lee, Anyang-si (KR); Jin Young Chun, Anyang-si (KR); Sung Ho Park, Anyang-si (KR); Moon Il Lee, Anyang-si (KR); Hyun Soo Ko, Anyang-si (KR); Bin Chul Ihm, Anyang-si (KR)

(73) Assignee: LG Electronics Inc., Seoul (KR)

( * ) Notice: Subject to any disclaimer, the term of this patent is extended or adjusted under 35 U.S.C. 154(b) by 403 days.

(21) Appl. No.: 12/385,363

(22) Filed: Apr. 6, 2009

(65) Prior Publication Data

US 2009/0257383 A1 Oct. 15, 2009

Related U.S. Application Data

(60) Provisional application No. 61/042,778, filed on Apr. 7, 2008, provisional application No. 61/074,132, filed on Jun. 19, 2008, provisional application No. 61/050,591, filed on May 5, 2008, provisional application No. 61/151,161, filed on Feb. 9, 2009.

(30) Foreign Application Priority Data

Aug. 20, 2008 (KR) ........................ 10-2008-0081244

(51) Int. Cl.
*H04Q 7/00* (2006.01)
(52) U.S. Cl. .................................. 370/334; 375/240.07
(58) Field of Classification Search .................. 370/249, 370/341, 334, 329; 375/240.07, 316, 267, 375/140, 299, 260; 455/68, 69, 70, 126
See application file for complete search history.

(56) References Cited

U.S. PATENT DOCUMENTS

| 7,649,831 | B2 * | 1/2010 | Van Rensburg et al. ....... 370/203 |
| 7,941,186 | B2 * | 5/2011 | Cho et al. ...................... 455/561 |
| 2006/0279460 | A1 * | 12/2006 | Yun et al. ...................... 342/377 |
| 2008/0037669 | A1 * | 2/2008 | Pan et al. ...................... 375/260 |
| 2008/0256163 | A1 * | 10/2008 | Clerckx et al. ............... 708/607 |
| 2009/0086842 | A1 * | 4/2009 | Shi et al. ....................... 375/267 |
| 2009/0128381 | A1 * | 5/2009 | Choi et al. .................... 341/106 |
| 2009/0129502 | A1 * | 5/2009 | Tong et al. .................... 375/299 |
| 2011/0122971 | A1 * | 5/2011 | Kim et al. ..................... 375/316 |

FOREIGN PATENT DOCUMENTS

| KR | 2006-0022630 | 3/2006 |
| WO | WO 03/073646 | 9/2003 |
| WO | WO 2006/093385 | 9/2006 |
| WO | WO 2007/105928 | 9/2007 |

* cited by examiner

*Primary Examiner* — Brenda H Pham
(74) *Attorney, Agent, or Firm* — McKenna Long & Aldridge LLP (57) ABSTRACT

A feedback method for performing a feedback by using a codebook in Multiple Input Multiple Output (MIMO) system includes receiving, by the mobile station, a MIMO mode type information, generating feedback information by using the codebook selected according to the MIMO mode type information, and transmitting the feedback information to the base station. The codebook includes a SU-MIMO codebook and a MU-MIMO codebook, and the MU-MIMO codebook is formed by extracting codebook elements from the SU-MIMO codebook. As a result, the method maximizes a system throughput simultaneously while effectively reducing an amount of feedback information.

9 Claims, 8 Drawing Sheets

| Feedback channel time index | 0 | 1 | 2 | 3 | 4 | 5 | 6 | 7 | 8 | 9 | 10 | 11 | 12 | 13 | 14 |
|---|---|---|---|---|---|---|---|---|---|---|---|---|---|---|---|
| | mode M CQI and/or PMI | mode M CQI and/or PMI | mode M CQI and/or PMI | mode M CQI and/or PMI | mode / CQI and/or PMI | mode / CQI and/or PMI | mode M CQI and/or PMI | mode M CQI and/or PMI | mode M CQI and/or PMI | mode M CQI and/or PMI | mode / CQI and/or PMI | mode / CQI and/or PMI | mode / CQI and/or PMI | mode / CQI and/or PMI | mode / CQI and/or PMI |

Feedback request mode (1) ↑ (at index 4)

Mode switching (M→1) ↑ (at index 10)

FIG. 9

FEEDBACK METHOD FOR PERFORMING A FEEDBACK BY USING A CODEBOOK IN MIMO SYSTEM

This application claims the benefit of the Korean Patent Application No. 10-2008-0081244, filed on Aug. 20, 2008, which is hereby incorporated by reference as if fully set forth herein.

This application also claims the benefit of U.S. Provisional Application Ser. Nos. 61/042,778, filed on Apr. 7, 2008, 61/074,132, filed on Jun. 19, 2008, 61/050,591, filed on May 5, 2008, and 61/151,161, filed on Feb. 9, 2009, the contents of which are hereby incorporated by reference herein in their entirety.

BACKGROUND OF THE INVENTION

1. Field of the Invention

The present invention relates to a mode adaptation method for a Multi-Input Multi-Output (MIMO) system, and more particularly to a method for reducing an amount of uplink feedback information.

2. Discussion of the Related Art

Closed-loop MIMO (CL-MIMO) systems, which are adaptively operated according to a channel condition of a user, among all MIMO systems based on a multi-antenna can greatly improve a performance or throughput of an overall system.

The closed-loop MIMO systems can be classified into a codebook based preceding system for reporting a preceding matrix index (PMI) and an analog feedback based precoding system for reporting a channel. The codebook based precoding system and the analog feedback based preceding system may have the following advantages and disadvantages.

The codebook based preceding system requires a small amount of feedback information, has a small number of channel quality indicator or information (CQI) mismatches, and reduces a flashlight effect according to codeword restriction. At this time, the CQI may be measured in either a midamble or common pilots on the basis of complete comprehension of both a precoder and an interferer.

The codebook based preceding system has the following disadvantages. In more detail, the codebook based preceding system has a large number of quantization errors and a low beamforming gain. In order to implement the above-mentioned codebook based preceding system, an appropriate codebook design is needed.

The analog feedback based preceding system reduces the number of quantization errors and acquires a high beamforming gain. On the other hand, the analog feedback based preceding system requires an excessive amount of either feedback information or feedback errors, has a large number of CQI mismatches, and generates the flashlight effect. Specifically, if the analog feedback based preceding is used for a multi-user MIMO system, the CQI can be measured in only dedicated pilots. Also, provided that the analog feedback based preceding system does not recognize the interfering precoder, the mobile station is unable to measure the CQI. In order to implement the analog feedback based preceding system, a sounding channel is needed.

Therefore, the codebook based preceding system has the above-mentioned advantages, such that it has been widely used for a 3GPP LTE system, a WiMAX system, and a 2GPP2 Ultra Mobile Broadband (UMB) system.

The MIMO systems are classified into a single user MIMO (SU-MIMO) system and a multi-user MIMO (MU-MIMO) system according to methods for allocating the spatial resources.

Figure 1:
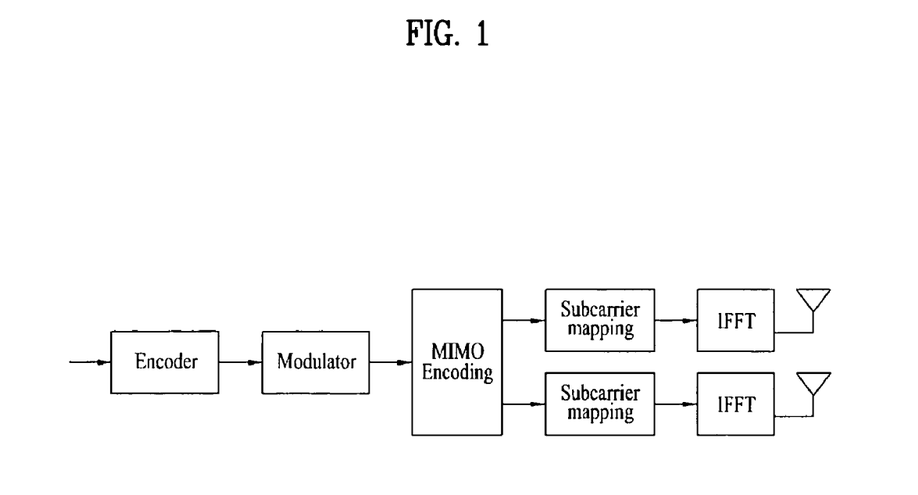
FIGS. 1 and 2 illustrate block diagrams illustrating transmission structures when data is transferred at two or more spatial multiplexing rates.
Figure 2:
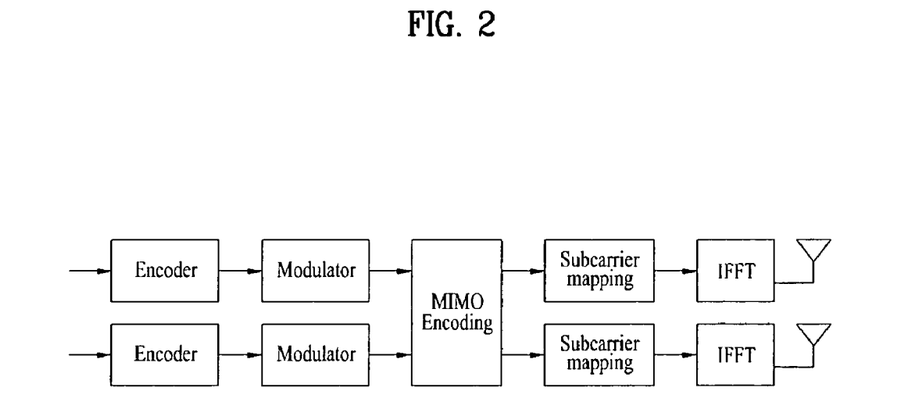

FIGS. 1 and 2 illustrate block diagrams illustrating transmission structures when data is transferred at two or more spatial multiplexing rates.

FIG. 1 shows a case in which a vertical encoding (or a single codeword (SCW)) are used. FIG. 2 shows another case in which horizontal encoding (or a multi-codeword (MCW)) are used.

The SU-MIMO system allocates all of the spatial resources to only one mobile station (MS). When the SU-MIMO system is operated under a closed-loop MIMO scheme, each mobile station (MS) selects a preferred rank (i.e., a spatial multiplexing rate), and reports the preferred rank, a preceding matrix index (PMI) and a channel quality information (CQI) which are suitable for the selected rank. A base station (BS) allocates only one mobile station (MS) to a resource (i.e., time and frequency) using such feedback information. In this case, the spatial resources are all used by the mobile station (MS). Here, the SCW or MCW may be used as the transmission structure.

The MU-MIMO system is used to allocate spatial resources to a few mobile stations. When the MU-MIMO system is operated under the CL-MIMO scheme, each mobile station (MS) transmits the CQI and the PMI according to MU-MIMO conditions. In this case, the MU-MIMO conditions are a preceding matrix set, MU-MIMO types (PU2RC, ZF-BF, . . . ), and the like. The base station (BS) selects mobile stations (MSs) satisfying a specific condition using the received information, and allocates the selected mobile stations to a resource (i.e., time and frequency). Here, the transmission structure is set to the MCW.

Generally, if the number of users is small, the SU-MIMO system has a good throughput superior to that of the MU-MIMO system. If the number of users is large, the MU-MIMO system has a good throughput superior to that of the SU-MIMO system. When several users are paired with each other in the MU-MIMO system, if orthogonal pairs of users are found, the throughput of the MU-MIMO system becomes better. The larger the number of users, the higher the probability of generating the orthogonal pairs.

Figure 3:
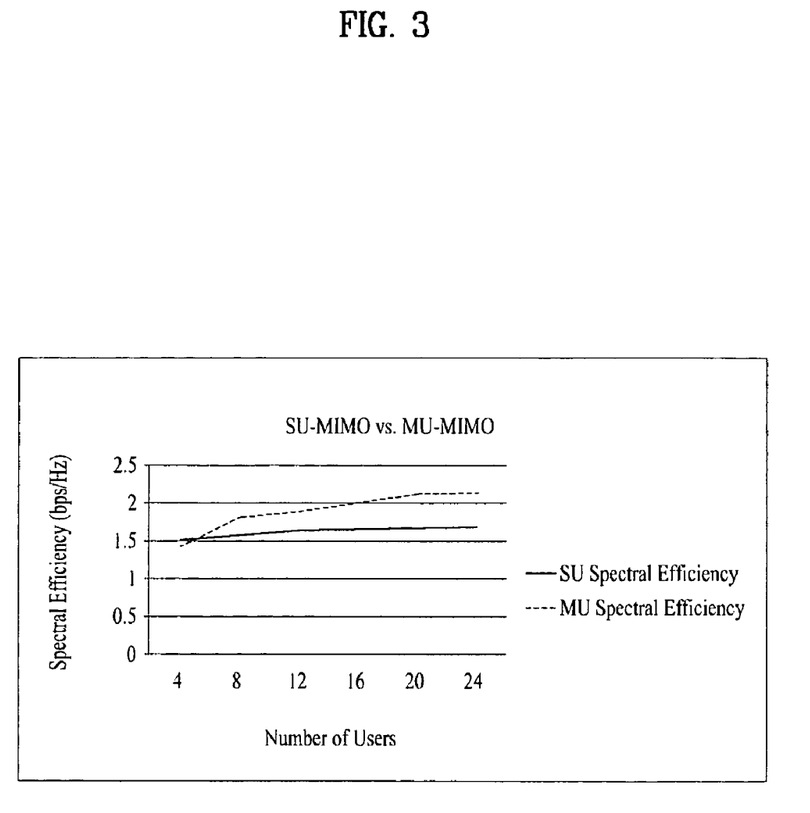
FIG. 3 is a graph showing a comparison of throughput between an SU-MIMO and an MU-MIMO.

FIG. 3 is a graph showing a comparison of throughput between the SU-MIMO system and the MU-MIMO system.

In FIG. 3, if about 5 or more people are in a cell, the MU-MIMO system has a good throughput superior to that of the SU-MIMO system. This specific point is called an SU-MU switching point. This switching point may occur at different positions according to a channel status, a user status and the like.

In more detail, a throughput of an optimum system must follow envelopes of the SU-MIMO throughput and the MU-MIMO throughput. For this operation, the mobile station (MS) must carry out not only a feedback operation suitable for the SU-MIMO system but also another feedback operation suitable for the MU-MIMO system. As a result, an amount of feedback overhead unavoidably increases.

Generally, a codebook structure is pre-decided. Specifically, in case of the MU-MIMO mode, if the number of users is not very large, a codebook size must be small such that a pairing gain arises. Therefore, the codebook size for the MU-MIMO mode has generally been designed to be smaller than that of the SU-MIMO mode, such that a beamforming gain decreases.

SUMMARY OF THE INVENTION

Accordingly, the present invention is directed to a mode adaptation method for a MIMO system that substantially obviates one or more problems due to limitations and disadvantages of the related art.

An object of the present invention is to provide a mode adaptation method for maximizing a system throughput simultaneously while effectively reducing an amount of feedback information.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, 1. A feedback method for performing a feedback by using a codebook in Multiple Input Multiple Output (MIMO) system, the method including: receiving, by the mobile station, a MIMO mode type information; generating feedback information by using the codebook selected according to the MIMO mode type information; and transmitting the feedback information to the base station. The codebook includes a SU-MIMO codebook and a MU-MIMO codebook, and the MU-MIMO codebook is formed by extracting codebook elements from the SU-MIMO codebook.

The MIMO mode type information may be one of the a single-user MIMO (SU-MIMO) mode, a multi user MIMO (MU-MIMO) mode 2 supporting two mobile stations, a MU-MIMO mode 3 supporting three mobile stations and a MU-MIMO mode 4 supporting four mobile stations.

The feedback method may further include receiving the SU-MIMO codebook and the MU-MIMO codebook.

The feedback method may further include: receiving rank information and codebook size information, and wherein the MU-MIMO codebook is determined according to the rank information and the codebook size information.

A part of elements of the SU-MIMO codebook may be prohibited from being used.

In another aspect of the present invention, there is provided a feedback method for performing a feedback by using a codebook in Multiple Input Multiple Output (MIMO) system, the method including: transmitting, by the base station, a SU-MIMO codebook; transmitting MIMO mode type information; and receiving feedback information by using the codebook selected according to the MIMO mode type information and the SU-MIMO codebook. The codebook includes the SU-MIMO codebook and a MU-MIMO codebook, and the MU-MIMO codebook is formed by extracting codebook elements from the SU-MIMO codebook.

The MIMO mode type information may be one of the a single-user MIMO (SU-MIMO) mode, a multi user MIMO (MU-MIMO) mode 2 supporting two mobile stations, a MU-MIMO mode 3 supporting three mobile stations and a MU-MIMO mode 4 supporting four mobile stations.

The feedback method may further include reporting rank information and codebook size information, and wherein the MU-MIMO codebook is determined according to the rank information and the codebook size information.

A part of elements of the SU-MIMO codebook may be prohibited from being used.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts. The following embodiments of the present invention may be modified into various formats, and the scope of the present invention is not limited to only the following embodiments and can also be applied to other examples.

Figure 4:
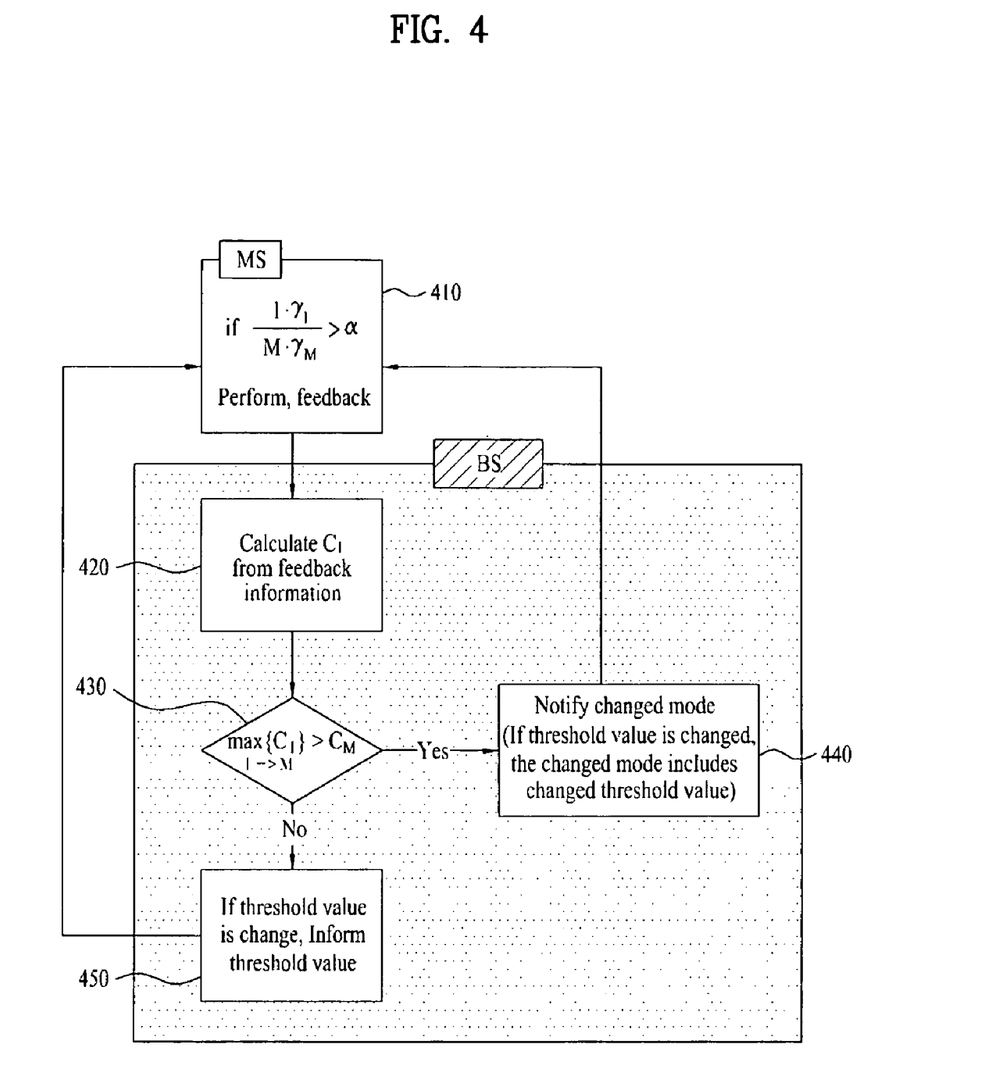
FIG. 4 is a flow chart illustrating a method for reducing an amount of feedback information using a mode adaptation method according to one embodiment of the present invention.

FIG. 4 is a flow chart illustrating a method for reducing an amount of feedback information using a mode adaptation method according to the present invention.

In FIG. 4, 1 is the number of mobile stations (MSs) transferred at one time under a specific mode (1), and M is the number of mobile stations (MSs) transferred at one time under another mode (M).

The mode may be indicated from the base station (BS). The mode may be set to the mode M which is transferred through a downlink control channel such as an IEEE 802.16e's MAP or a submap.

$\gamma_1$ may be calculated by the mobile station, and may be a capacity or throughput as a metric of the 1-th mode. In this case, it is assumed that $1*\gamma_1$ and $M*\gamma_M$ are called throughput metrics. $C_1$ is a metric calculated by the base station on the basis of a feedback of the mobile station. For example, $C_1$ may be a sum average capacity (SAC) or a sum average throughput (SAT), etc.

α is a threshold value for a feedback. If a specific condition $$\frac{l \cdot \gamma_l}{M \cdot \gamma_M} > \alpha$$

is provided, the mobile station reporting the 1-th mode's feedback. α may be a value indicated by the base station, a predetermined value, or another value arbitrarily decided by each mobile station.

In FIG. 4, the mobile station determines whether a ratio of a throughput metric of a current mode (M) to a throughput metric of another mode (1) to which a MIMO mode will be switched is higher than a threshold value at step 410. In this case, if the above ratio is higher than the threshold value, the mobile station reports information of the mode (1) to which the MIMO mode will be switched, to the base station.

Next, the base station having received feedback information calculates the sum average throughput metric of the mode (1) using feedback information at step 420, and determines whether the calculated sum average throughput metric is higher than a mode switching threshold value at step 430. FIG. 4 exemplarily shows a sum average throughput metric of a current mode (M) as the mode switching threshold value.

If the sum average threshold metric of the mode (1) is higher than the mode switching threshold value at step 430, the MIMO mode is changed to the mode (1), and the changed MIMO mode, i.e., the mode (1) is notified to the mobile station at step 440. At this time, if the threshold value a is changed, information of the changed threshold value is also notified to the mobile station.

In the meantime, if the sum average throughput metric of the mode (1) is equal to or less than the mode switching threshold value, only information of the threshold value a may be notified to the mobile station at step 450.

Each mobile station may report mode information, a mode index, a CQI and/or a PMI and the like to the base station in various ways.

Figure 5:
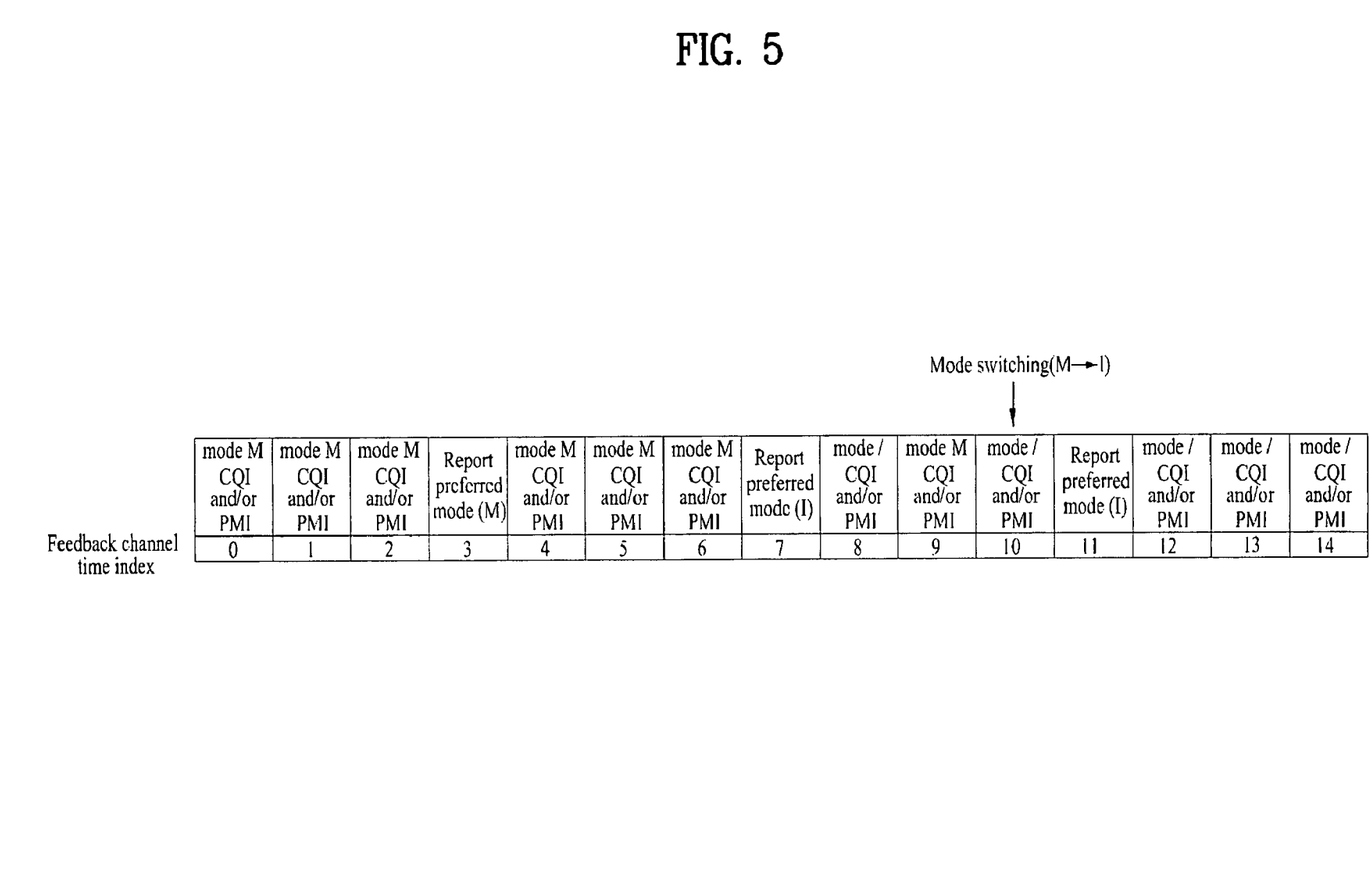
FIG. 5 shows a method for transferring information of a preferred mode, instead of a CQI and PMI of a current mode, over a feedback channel at intervals of a specific period.

FIG. 5 shows a method for transferring information of a preferred mode, instead of a CQI and PMI of a current mode, through a feedback channel at intervals of a specific period through a feedback channel.

Particularly, if an amount of information of the preferred mode is larger than a capacity of a feedback channel, this preferred mode information may be divisionally transferred several times through the feedback channel. For some examples, the following cases will be described in detail.

Provided that mode indication information is transferred at intervals of four periods, the mobile station transmits feedback information (CQI and/or PMI) of the mode M indicating a current mode at the time indexes 0, 1 and 2 the feedback channel. If another mode (mode 1) does not satisfy $$\frac{l \cdot \gamma_l}{M \cdot \gamma_M} > \alpha$$

at the time index 3 of the feedback channel, the mode M is fed back as a preferred mode by the mobile station, and feedback information (CQI and/or PMI) of the mode M being the current mode is then transferred from the mobile station to the base station. If the mode 1 satisfies $$\frac{l \cdot \gamma_l}{M \cdot \gamma_M} > \alpha$$

at the time index 7 of the feedback channel indicating a mode feedback period, feedback information (CQI and/or PMI) of the mode 1 is transferred to the base station at the time index 8 of the feedback channel. Thereafter, feedback information (CQI and/or PMI) of the mode M indicating the current mode is transferred to the base station. If the current mode M is changed to the mode 1 at the time index 10 of the feedback channel, the mobile station transmits feedback information (CQI and/or PMI) of the mode 1 to the base station.

Figure 6:
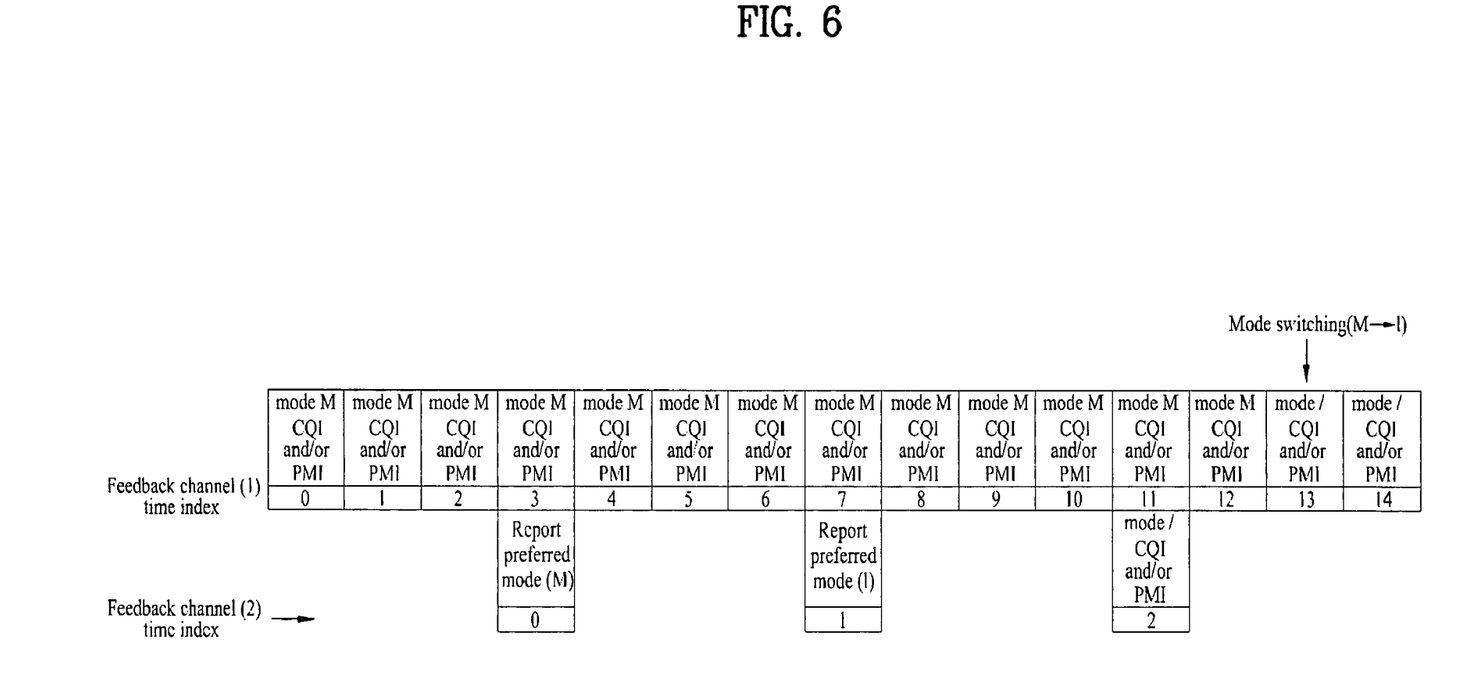
FIG. 6 shows a method for periodically transferring information of a preferred mode over an additional feedback channel.

FIG. 6 shows a method for periodically transferring information of a preferred mode through an additional feedback channel.

Referring to FIG. 6, MS reports the CQI and/or PMI of the current mode (mode M) via feedback channel 1, and MS reports feedback information of another mode via feedback channel 2. For example, if another mode (mode 1) does not satisfy $$\frac{l \cdot \gamma_l}{M \cdot \gamma_M} > \alpha$$

at a time index 0 of the feedback channel 2 (denoted by "feedback channel (2) time index 0" in FIG. 6) so that the current mode is considered to be an optimum mode, the mobile station reports the mode M as a preferred mode to the base station. If the mode 1 satisfies $$\frac{l \cdot \gamma_l}{M \cdot \gamma_M} > \alpha$$

at a time index 1 of the feedback channel 2 (denoted by "feedback channel (2) time index 1"), the mobile station reports that the mode 1 is preferred, and then reports the CQI and/or PMI of the mode 1 at a time index 2 of the feedback channel 2 (denoted by "feedback channel (2) time index 2"). In this case, the mobile station may report a preferred mode instead of reporting the CQI and/or PMI of the mode 1 at the time index 2 of the feedback channel 2, and may also transmit the CQI and/or PMI of the mode 1 through another channel.

If another mode satisfies $$\frac{l \cdot \gamma_l}{M \cdot \gamma_M} > \alpha$$

according to an event trigger scheme, the following two methods may be used.

According to a first method, a mobile station requests an additional feedback channel from a base station, and transmits the CQI and/or PMI of the mode 1 through a feedback channel allocated by the base station. According to a second method, if a mobile station has data to be transferred to an uplink, it attaches the CQI and/or PMI of the mode (1) to the channel of the data, and transmits the attached result to the uplink.

Figure 7:
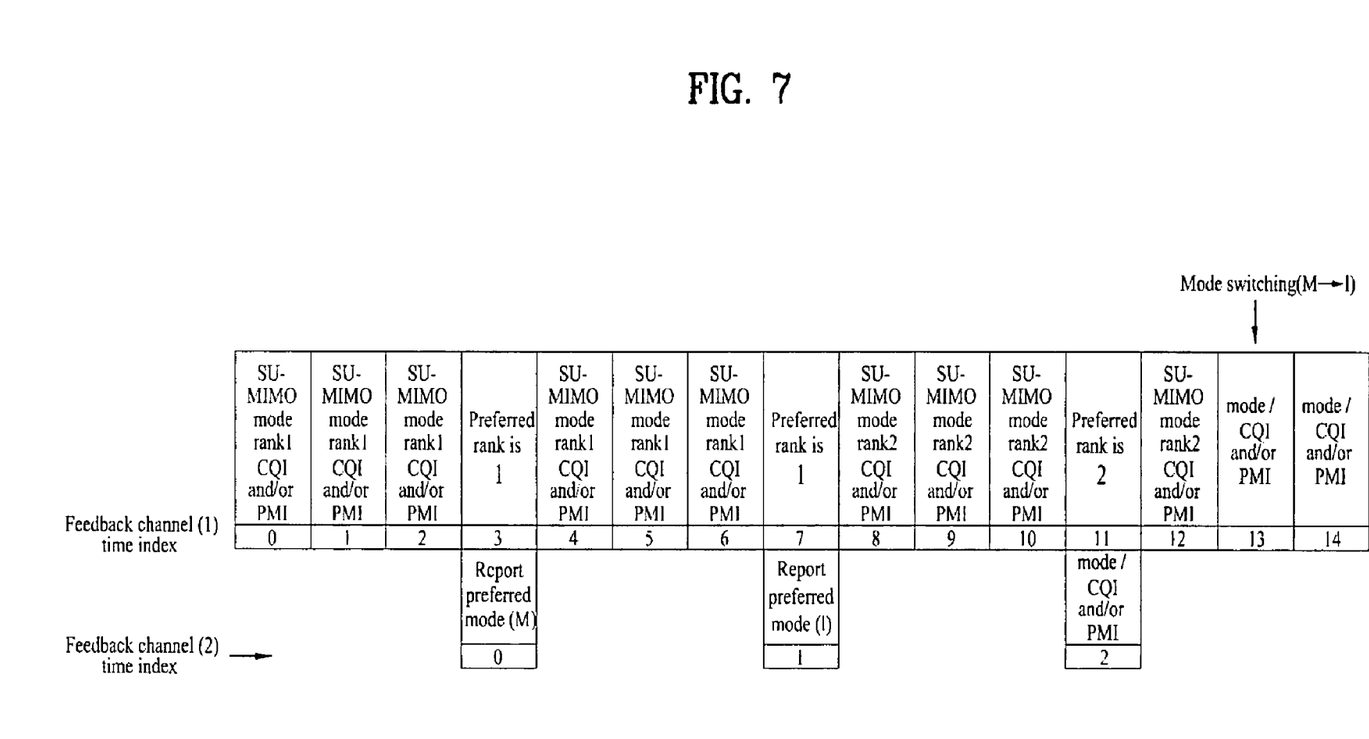
FIG. 7 shows an exemplary case for transferring rank information instead of preferred mode information.

FIG. 7 shows an exemplary case for transferring rank information instead of preferred mode information.

If a current mode is set to the SU-MIMO mode, the mobile station may transmit rank information instead of the CQI and/or PMI of the mode M (SU-MIMO).

If the SU-MIMO rank adaptation period (i.e., a period for selecting a preferred rank by the mobile station) is set to 4, the mobile station transfers its own preferred rank at intervals of four time indexes of feedback channel (1). At this time, if the preferred rank is changed to another rank (e.g., rank 2 in FIG. 7), the mobile station transmits the CQI and/or PMI suitable for the changed rank via additional feedback channel, e.g., feedback channel (2). Meanwhile, the CQI and/or PMI suitable for the changed rank may be transmitted via the feedback channel, e.g., feedback channel (1) through which the information of the changed rank is transmitted at a period when the information of the changed rank is transmitted without allocating an additional feedback channel for the CQI and/or PMI.

In this case, the base station may allocate an additional feedback channel for the rank information.

Figure 8:
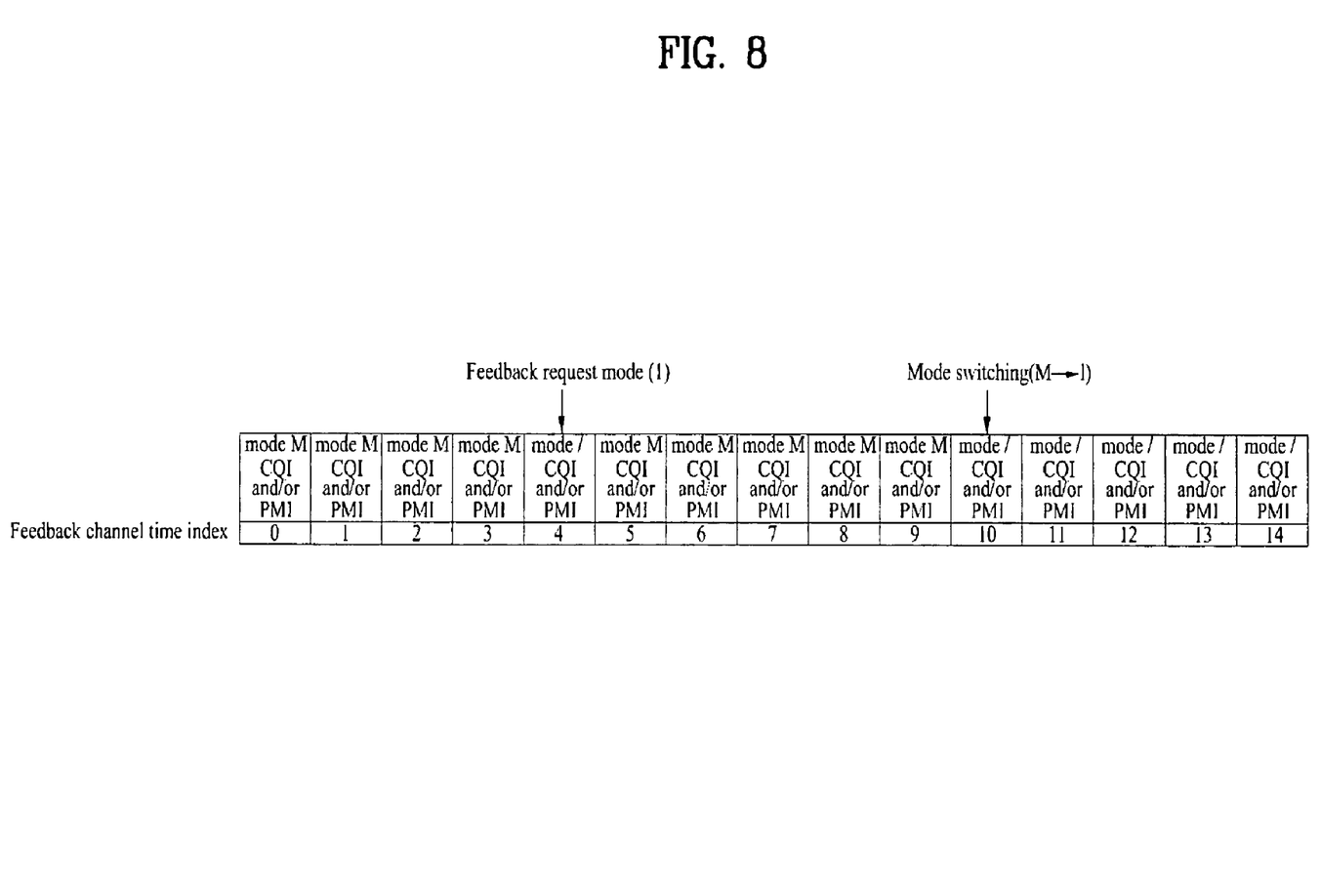
FIG. 8 shows a method for requesting a feedback of a specific mode by a base station (BS) and performing the feedback of the requested mode by a mobile station (MS)

FIG. 8 shows a method for requesting a feedback of a specific mode by a base station (BS) and performing the feedback of the requested mode by a mobile station (MS).

Referring to FIG. 8, the base station may request a feedback of the mode (1) from the mobile station. In other words, under the condition that the current mode is the mode (M) and some mobile stations perform a feedback of information of the mode (1), if the base station requires more information of the mode (1), it may ask the mobile station to feed back the information of the mode (1). In this case, a feedback may be performed as follows. In more detail, the mobile station reports information of a corresponding mode only once or a predetermined number of times requested by the base station, and then reports information of a current mode. Specifically, if an amount of information of the requested mode is larger than a capacity of a current feedback channel, this requested mode information may be divisionally transferred several times through the feedback channel. In the meantime, if the base station asks the mobile station to perform a feedback of information of another mode using the event trigger scheme, the following methods may be used. According to a first method, the base station allocates a new feedback channel, and transmits the CQI and/or PMI of the requested mode through this newly-allocated feedback channel (i.e., an additional feedback channel). According to a second method, if the mobile station has data to be transferred to an uplink, it attaches the CQI and/or PMI of the requested mode to a channel of the data, and transmits the attached result to the uplink.

As described above, if a user is located at a cell edge (hereinafter referred to as a cell-edge user), the user may be operated using the SU-MIMO scheme or another MIMO scheme (e.g., a collaborative MIMO scheme) regardless of a mode of the cell. In this case, the feedback may also be adjusted to the corresponding scheme. Specifically, in case of using a fractional frequency reuse (FFR) method, the FFR method allocates a specific frequency band to a cell edge, reports only the specific frequency band (the corresponding FFR band) according to the SU-MIMO scheme or the collaborative MIMO scheme, and may also report the remaining bands using a mode applied to a current cell in the same manner as in the above-mentioned description.

In the meantime, some codebook elements are extracted from the SU-MIMO codebook set on the condition that a codebook is limited, such that the MU-MIMO codebook may be constructed.

In association with the MU-MIMO codebook, it is assumed that the number of transmission (Tx) antennas is set to $N_t$.

At this time, the mode may include the SU-MIMO mode, an MU-MIMO mode having a rank 2, an MU-MIMO mode having a rank 3, . . . , an MU-MIMO mode having a rank $N_t$, etc. A preceding matrix set of each mode can be represented by the following equation 1.

[Equation 1]
SU-MIMO $$\text{rank1: } S_1 = \{\{v_{1,1,1}\}, \{v_{1,2,1}\} \ldots, \{v_{1,K1,1}\}\}$$

$$\text{rank2: } S_2 = \{\{v_{2,1,1}, v_{2,1,2}\}, \{v_{2,2,1}, v_{2,2,2}\} \ldots, \{v_{2,K2,1}, v_{2,K2,2}\}\}$$

$$\text{rank } Nt: S_{Nt} = \{\{v_{Nt,1,1}, \ldots, v_{Nt,1,Nt}\}, \{v_{Nt,2,1}, \ldots, v_{Nt,2,Nt}\} \ldots, \{v_{Nt,K,1}, \ldots, v_{Nt,KNt,Nt}\}\}$$

$$\text{MU-MIMO with rank2: } M_2 = \{\{p_{2,1,1}, p_{2,1,2}\}, \{p_{2,2,1}, p_{2,2,2}\} \ldots, \{p_{2,K2',1}, p_{2,K2',2}\}\}$$

$$\text{MU-MIMO with rank } Nt: M_{Nt} = \{\{p_{Nt,1,1}, \ldots, p_{Nt,1,Nt}\}, \{p_{Nt,2,1}, \ldots, p_{Nt,2,Nt}\} \ldots, \{p_{Nt,K,1}, \ldots, p_{Nt,KNt',Nt}\}\}$$

In Equation 1, K# is a codebook size of the SU-MIMO rank #, and K#' is a codebook size of the MU-MIMO rank #. K# and K#' may be different from each other as necessary.

In this case, the base station may inform the mobile station of the K# and K#' values and constituent entities. If the base station informs the mobile station of only the K# and K#' values, it may use a specific codebook set predetermined for the K# or K#' value.

A codebook of the feedback MU-MIMO can be constructed as follows according to the following two MU-MIMO transmission methods.

The MU-MIMO codebook performing a feedback using the following two methods according to MU-MIMO transmission methods, may be configured.

According to a first method, if a codebook being reporting is different from a codebook transferred from the base station, the MU-MIMO codebook for a feedback toward an uplink may include codebook elements of a rank 1. The base station may use and combine feedback information, such that it may configure another-format precoder. In this case, the rank 1 codebook elements may be a subset of the SU-MIMO rank (1) codebook.

According to a second method, if a feedback codebook is equal to another codebook transferred from the base station, the MU-MIMO codebook for a feedback toward the uplink can be operated as follows. In the MU-MIMO of the rank 2 (denoted by "MU-MIMO with rank 2"), a codebook includes codebook elements of the rank 2. In the MU-MIMO of the rank 3 (denoted by "MU-MIMO with rank 3"), a codebook includes codebook elements of the rank 3.

In this case, a precoding matrix set for each mode can be represented by the following equation 2.

[Equation 2]
SU-MIMO $$\text{rank1: } S_1 = \{\{v_{1,1,1}\}, \{v_{1,2,1}\} \ldots, \{v_{1,K1,1}\}\}$$

$$\text{rank2: } S_2 = \{\{v_{2,1,1}, v_{2,1,2}\}, \{v_{2,2,1}, v_{2,2,2}\} \ldots, \{v_{2,K2,1}, v_{2,K2,2}\}\}$$

$$\text{rank } Nt: S_{Nt} = \{\{v_{Nt,1,1}, \ldots, v_{Nt,1,Nt}\}, \{v_{Nt,2,1}, \ldots, v_{Nt,2,Nt}\} \ldots, \{v_{Nt,K,1}, \ldots, v_{Nt,KNt,Nt}\}\}$$

$$\text{MU-MIMO with rank2: } M_2 = \{\{v_{2,k1,1}, v_{2,k1,2}\}, \{v_{2,k2,1}, v_{2,k2,2}\} \ldots\}$$

MU-MIMO with rank Nt: MNt={{$v_{Nt,k1,1}$, ..., $v_{Nt,k1,Nt}$}, $v_{Nt,k2,1}$, ..., $v_{Nt,k2,Nt}$} ... }

In other words, the MU-MIMO codebook may extract some constituent elements from the SU-MIMO codebook of the same rank.

The base station changes the number of codebook elements constructing the MU-MIMO and their constituent entities to others, and may inform the mobile station of both the changed number of codebook elements and the changed constituent entities. For example, in case of a codebook entry, the base station may extract the codebook entry on the basis of SU-MIMO feedback information received from the mobile station, and may broadcast the constructed codebook set to the mobile station. In this case, K#' may be predetermined for each rank, or may be indicated to the mobile station. The constructed codebook includes some parts of preferred codebook indexes of each mobile station. So, although the MU-MIMO system uses a small-sized codebook set, it can acquire a higher beamforming gain.

Specific constituent elements of the SU-MIMO codebook may not be used due to a request from another cell or other reasons. For example, if another cell mobile station reports that a specific codebook element (e.g., $v_{1,k,1}$) influences greatly due to interference, this constituent element may not be used. In addition, if $\alpha \cdot v_{1,k,1}$ is contained in a codebook of a higher rank, this codebook element may not be also used.

The MU-MIMO operations based on the above-mentioned codebook are as follows.

First, if the rank of the MU-MIMO codebook is equal to a transmission rank, i.e., if the MU-MIMO codebook of the rank 2 is configured in the form of Nt×2 matrix, the mobile station calculates the CQI using a reception algorithm for each codebook element, and feeds back its own preferred preceding matrix index (PMI), a stream index, a CQI, etc. The base station performs pairing of mobile stations, and applies a corresponding codebook to the paired mobile stations.

Next, if the codebook rank of the MU-MIMO for a feedback toward an uplink is set to 1, i.e., if the MU-MIMO codebook is configured in the form of an Nt×1 matrix, the mobile station calculates the CQI on the assumption of a single rank transmission (rank1 transmission) for each codebook element, and reports a preceding matrix/vector index, and the CQI. Otherwise, provided that orthogonal or almost-orthogonal codebook elements of individual codebook elements are paired with each other, the mobile station calculates the CQI using a reception algorithm implemented by the MU-MIMO mode. The precoding matrix/vector index and the CQI are reported from the mobile station.

The base station performs pairing of mobile stations using such feedback information, modifies the CQI as necessary, and then selects an MCS level. The base station modifies a preceding matrix according to a selected MU-MIMO algorithm (e.g., ZF-BF, PU2RC, or SDMA), and transmits the modified preceding matrix to each mobile station.

Figure 9:
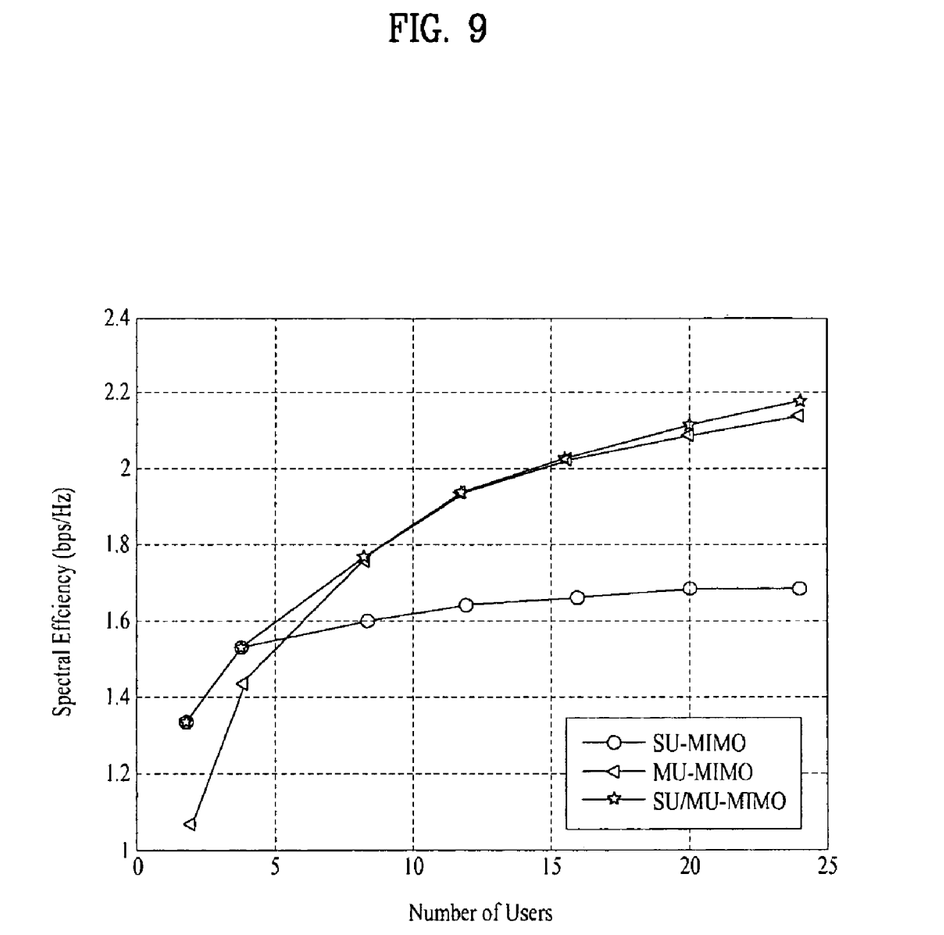
FIG. 9 is a graph illustrating a throughput of a mode adaptation method according to the present invention.

FIG. 9 is a graph illustrating a throughput of a mode adaptation method (SU-MIMO or MU-MIMO) according to the present invention.

As can be seen from FIG. 9, it can be readily recognized that a throughput graph of the mode adaptation method according to one embodiment of the present invention closely follows envelopes indicating optimum throughputs of the SU-MIMO and the MU-MIMO.

Although the present invention has been disclosed by referring to the above-mentioned embodiments, it should be noted that the aforementioned embodiments have been disclosed for only illustrative purposes, and those skilled in the art will appreciate that various modifications, additions and substitutions are possible, without departing from the scope and spirit of the invention as disclosed in the accompanying claims. Thus, it is intended that the present invention covers the modifications and variations of this invention provided they come within the scope of the appended claims and their equivalents.

As apparent from the above description, the present invention provides a method for reducing an amount of uplink feedback information using a mode adaptation method of the MIMO system. This method can be applied to a base station, a mobile station and the like of the IEEE 802.16m system. So, the present invention can maximize a system throughput simultaneously while effectively reducing an amount of feedback information.

What is claimed is:

1. A feedback method for performing a feedback by using a codebook in Multiple Input Multiple Output (MIMO) system, the method comprising:
   receiving, by the mobile station, a MIMO mode type information;
   generating feedback information by using the codebook selected according to the MIMO mode type information; and
   transmitting the feedback information to the base station,
   wherein the codebook includes a SU-MIMO codebook and a MU-MIMO codebook, and the MU-MIMO codebook is formed by extracting codebook elements from the SU-MIMO codebook.

2. The feedback method according to claim 1, wherein the MIMO mode type information is one of the a single-user MIMO (SU-MIMO) mode, a multi user MIMO (MU-MIMO) mode 2 supporting two mobile stations, a MU-MIMO mode 3 supporting three mobile stations and a MU-MIMO mode 4 supporting four mobile stations.

3. The feedback method according to claim 1, further comprising:
   receiving the SU-MIMO codebook and the MU-MIMO codebook.

4. The feedback method according to claim 1, further comprising:
   receiving rank information and codebook size information, and wherein the MU-MIMO codebook is determined according to the rank information and the codebook size information.

5. The feedback method according to claim 1, wherein a part of elements of the SU-MIMO codebook is prohibited from being used.

6. A feedback method for performing a feedback by using a codebook in Multiple Input Multiple Output (MIMO) system, the method comprising:
   transmitting, by the base station, a SU-MIMO codebook;
   transmitting MIMO mode type information; and
   receiving feedback information by using the codebook selected according to the MIMO mode type information and the SU-MIMO codebook,
   wherein the codebook includes the SU-MIMO codebook and a MU-MIMO codebook, and the MU-MIMO codebook is formed by extracting codebook elements from the SU-MIMO codebook.

7. The feedback method according to claim 6, wherein the MIMO mode type information is one of the a single-user MIMO (SU-MIMO) mode, a multi user MIMO (MU-MIMO) mode 2 supporting two mobile stations, a MU-MIMO mode 3 supporting three mobile stations and a MU-MIMO mode 4 supporting four mobile stations.

8. The feedback method according to claim 6, further comprising:
reporting rank information and codebook size information, and wherein the MU-MIMO codebook is determined according to the rank information and the codebook size information.

9. The feedback method according to claim 6, wherein a part of elements of the SU-MIMO codebook is prohibited from being used.

* * * * *